Jan. 23, 1940.   B. STEVENS, JR., ET AL   2,188,101
ELECTRIC MOTOR
Filed Jan. 20, 1938
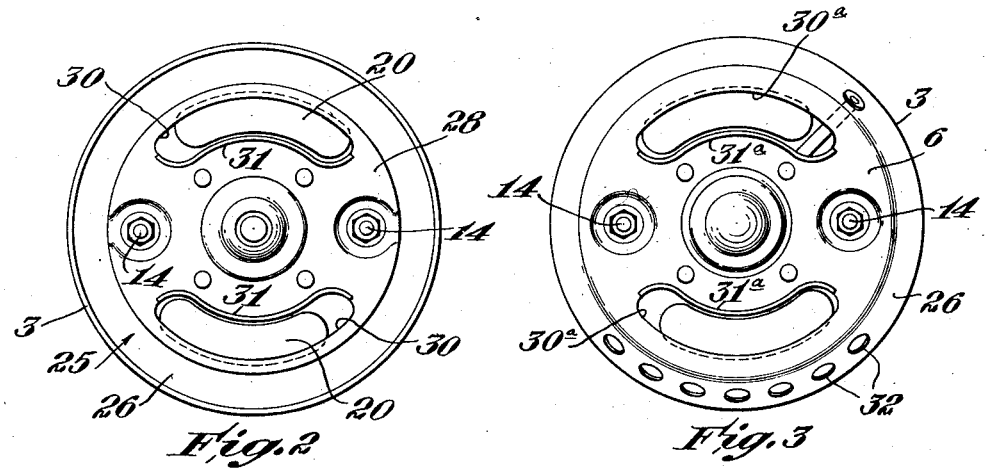
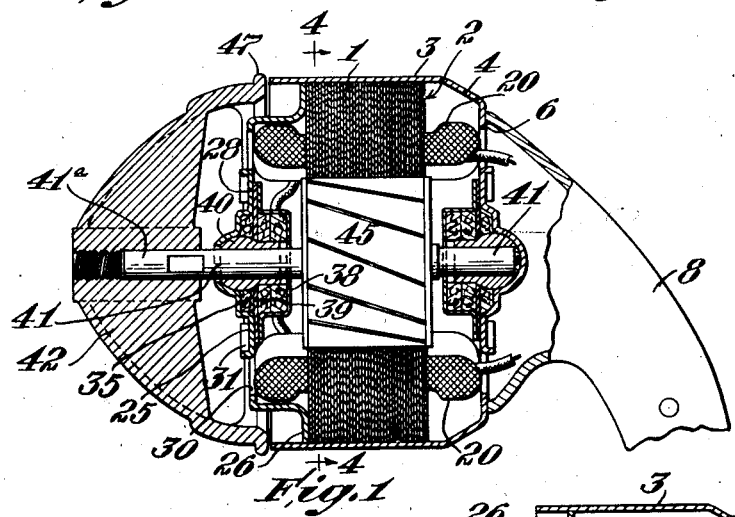
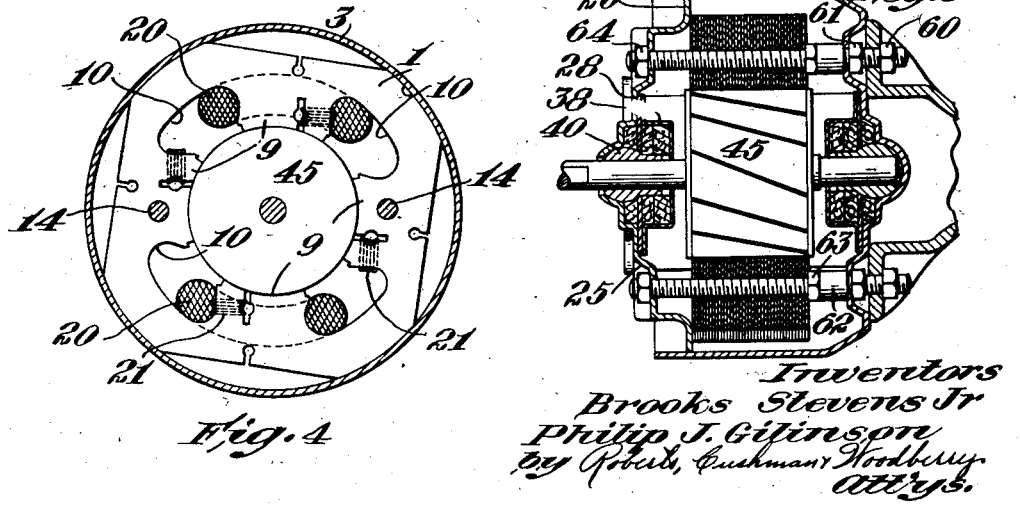
Inventors
Brooks Stevens Jr
Philip J. Gilinson
by Roberts, Cushman & Woodberry
attys.

Patented Jan. 23, 1940

2,188,101

UNITED STATES PATENT OFFICE 2,188,101

ELECTRIC MOTOR

Brooks Stevens, Jr., Concord, and Philip J. Gilinson, Lowell, Mass., assignors to Heinze Electric Company, Lowell, Mass., a corporation of Maine Application January 20, 1938, Serial No. 185,878

14 Claims. (Cl. 172—36)

The present invention relates to improved electric motors and more particularly to improved structural arrangements of the component parts of such motors which are suitable, for example for small electric fans or the like.

The present invention provides an advantageous arrangement of the casing and associated parts of a small electric motor, particularly adapted to be employed in a fan providing a so-called "streamlined" assembly. Such a fan is commonly provided with blades of flexible or yieldable material, e. g., rubber, and has a rotatable nose portion of conoidal form. The apposite end of such an assembly may be provided with a correspondingly shaped end portion which merges into the supporting bracket for the motor, which in turn is mounted on a suitable base.

A fan of this type is characterized by a metal nose portion which has its center secured to a shaft extension projecting from the rotor of the motor. The copending application, Serial No. 185,877 of Brooks Stevens, Jr., filed on even date herewith, discloses a reinforcement for the nose of such a fan and for the associated shaft extension. The present invention affords improved arrangements of the component parts of the motor which contribute to this same general result and which also afford additional advantages in ease of assembly and in sturdiness of construction, while also facilitating the flow of air through the motor.

To permit these desirable results, the casing is preferably provided with an outer wall portion which may project laterally beyond the core assembly for the field coils. This assembly may conveniently be formed of laminae which fit within the cylindrical motor casing. Cooperating with the casing is an end plate which, in accordance with this invention, may be provided with a peripheral flange having its edge juxtaposed to the inner surface of the cylindrical casing member, but spaced laterally inward from the edge thereof, so that the end of the cylindrical member affords an annular flange projecting beyond the end plate. The marginal flange of the end plate preferably has a substantial area engaging the end lamina of the core assembly, thus providing a firm interengagement of these parts and permitting the provision of a sturdy inexpensive assembly.

The end plate may also be provided with a dished portion, the central part of which supports a bearing for the motor shaft. This dished portion of the end plate is also preferably provided with slots which may be shaped so that parts of the windings of the field coils may project slightly at this end of the motor, thus permitting greater compactness. The slots preferably are so arranged that they also afford suitable air passages about the coils to facilitate cooling of the motor during operation of the fan or the like.

In the accompanying drawing:

Fig. 1 is a vertical sectional view of a motor constructed in accordance with this invention, the motor being shown associated with parts of a fan assembly, one portion of which is shown in elevation;

Fig. 2 is an elevational view of the left-hand end of the motor shown in Fig. 1;

Fig. 3 is a similar view of the right-hand end of the motor shown in Fig. 1;

Fig. 4 is a section indicated by line 4—4 of Fig. 1; and

Fig. 5 is a horizontal sectional view of the motor assembly.

A motor constructed in accordance with the present invention may conveniently be provided with a core assembly 2 which may comprise a plurality of laminae 1 of similar shape. The core assembly 2 fits within the casing 3 of the motor, which may be formed of sheet metal and which may be of generally cylindrical form, the outer parts of the laminae 1 being rounded so that these parts fit firmly within the casing. The end of the casing 3 is provided with a frusto-conical portion 4 which is continued in an end wall 6. The frusto-conical portion 4 may provide a surface which is substantially aligned with a corresponding surface of a supporting bracket 8. Each of the laminae 1 may be of the form shown in Fig. 4 providing four inwardly extending slotted pole elements 9, the inner edges of which are shaped to conform to the circumference of a circle. Between these pole elements 9 each of the laminae is provided with a recess 10. It is evident that the laminae are assembled so that the pole elements and recesses are aligned with each other. To hold the laminae in proper assembled relation tie bolts 14 may extend through openings in opposite portions of the laminae through the end wall 6 of the casing and through the opposite end wall thereof, as will be more fully described. The field coils 20, as shown in Figs. 1 and 4, may be arranged about two opposite poles provided by the core assembly 2, while shading coils 21 may be mounted on each of the poles as shown.

In accordance with this invention, the cylindrical casing 3 may have an end portion projecting laterally for a substantial distance beyond the core 2 as shown in Fig. 1. Thus this portion of the casing provides an annular flange. The corresponding end wall 25 of the casing may be formed of sheet metal shaped to provide a peripheral flange 26, the edge of which is juxtaposed to the inner surface of the cylindrical wall of casing 3. The face of this flange 26 may have a substantial area engaging the lamina 1 at the end of the core assembly 2.

The end plate 25 is provided with a dished portion 28 disposed inwardly of the peripheral flange 26 thus affording room for the corresponding portions of the coils 20. In order to permit the maximum compactness, however, this portion of the end wall, has arcuate slots 30 cut therein, these slots conforming in curvature to the curvature of the adjoining portions of the coils 20 (Fig. 2) but extending circumferentially at a greater distance than these coils to afford air passages adjoining the coils. An arangement is thus provided so that the coils may project slightly, if desired, through the arcuate slots, thus allowing the maximum compactness of the motor. The sheet metal of the plate 25 is preferably struck up to provide flanges 31 extending along the inner edges of the slots 30. These flanges thus tend of stiffen and reinforce the mid-portion of the plate.

A bearing assembly 35 is preferably supported by the mid-portion of the end plate 25. This assembly may comprise an inner dished sheet metal member 38 enclosing felt disks 39 which may be saturated with lubricant. A bearing 40 of self-lubricating metal is disposed within the bearing assembly and has an outer spherical surface engageable with a correspondingly shaped portion of end plate 25. The bearing is also yieldably held in place by a retainer 39 formed of resilient metal and having an outer portion received between juxtaposed parallel faces of the end plate and of the dished member 38. The shaft 41 of the motor extends through bearing 40 and provides a shaft extension 41ª. This projecting shaft portion 41ª may have a nose reinforcement 42 secured thereto after the general manner disclosed in copending application Serial No. 185,877, the nose of the fan and the blades thereof being supported on the reinforcement 42. The rotor of the motor obviously includes an armature 45 secured to the shaft 41 and fitting within the core assembly 2, as shown.

Obviously the end wall 6 of the motor may support a bearing arrangement of the same general character as has been described, such a bearing assembly being shown for example at the right of Fig. 1. The end wall 6 may also be provided with arcuate slots 30ª, as shown in Fig. 3, these slots being shaped so that portions of the coils 20 may extend therethrough if desired. These slots may be similarly reinforced by flanges 31ª, as also shown in Fig. 3. The lower part of the end plate 6 may be provided with a plurality of openings 32 permitting additional circulation of air through this portion of the casing.

The bolts 14, which were previously referred to as extending through the laminae 1, may have parts projecting beyond the end wall 6 of casing 3 and through openings provided in the bracket 8. Nuts 60 are screwed onto these bolts to hold the motor on the bracket 8, while nuts 61 provide abutments engaging the outer face of the plate 6. Spacer sleeves 62 are disposed between the inner face of the plate 6 and nuts 63 which engage the end of core assembly 2. The opposite ends of the bolts 14 may be provided with nuts 64 which are tightened to bring the end plate 25 into firm, even engagement with the adjoining end of the core assembly 2. It is evident that such arrangement of the tie bolts 14, the nuts 60, 61, 63 and 64 as well as the spacers 63, permits the ready assembly of the parts of such motors despite nominal variations in dimensions thereof such as slight variations in dimensions of core members.

The projecting annular flange provided at the end of the casing 3 is juxtaposed to a bead 47 on the reinforcement 42 and this part of the casing may be substantially aligned with the sheet metal of the nose of the fan, the bead 47 projecting slightly outwardly beyond these surfaces and thereby affording a finished appearance for the joint between the nose and the casing 3.

The arrangement of the flanged end plate of the motor permits the same firmly to engage the stiff core assembly and also to engage the inner surface of the sheet metal casing 3, if desired, thus affording a firm support for the end plate. The provision of the reinforcing lips for the arcuate slots 30 affords a reinforcement for the mid-portion of the end plate where the bearing for the shaft extension is mounted. The dished arrangement of the end plate and the provision of the arcuate slots adjoining the field coils provides an arrangement permitting part of the motor to be disposed within the nose of the fan and allowing unusual compactness. A further advantage of this arrangement resides in the fact that the parts may readily be assembled despite the fact that the thicknesses of the core members of different fans may vary appreciably due to slight variations in the thicknesses of individual laminae. With an arrangement such as disclosed herein the parts may be readily assembled despite such variations in the thickness of the core assembly, the end plate 25 in any case being moved inwardly until it firmly engages the end lamina of the core assembly, the slots 30 providing room under all conditions for the adjoining portions of the field coils 20.

It is evident that the present invention affords a simple, inexpensive and sturdy structural arrangement of the component parts of an electric motor of the class described.

We claim:

1. An electric motor assembly comprising an outer casing affording a cylindrical wall and a dish-like end plate having a peripheral flange with an edge portion juxtaposed to the inner surface of said wall and spaced inwardly from the end thereof so that the end of said wall provides an annular flange projecting beyond the corresponding part of the end plate, said end plate having opposite substantially arcuate slots therein.

2. An electric motor assembly comprising an outer casing affording a cylindrical wall and a dish-like end plate having a peripheral flange with an edge portion juxtaposed to the inner surface of said wall and spaced inwardly from the end thereof so that the end of said wall provides an annular flange projecting beyond the corresponding part of the end plate, said end plate having opposite arcuate slots therein, the plate having out-turned lips extending along the slots.

3. An electric motor of the class described comprising a core assembly providing poles, windings for opposite poles of the assembly, a casing including a member providing a wall extending about the assembly, an end plate having a peripheral flange with an edge surface juxtaposed to the inner surface of said wall and with a face engaging the core assembly at the corresponding end of the motor.

4. An electric motor of the class described comprising a core assembly providing poles, windings for opposite poles of the assembly, a casing including a member providing a wall extending about the assembly, an end plate having a peripheral flange with an edge surface juxtaposed to the inner surface of said wall and with a face engaging the core assembly at the corresponding end of the motor, said end plate having slots adjoining portions of said windings whereby a suitable clearance is provided about said windings, and the motor may afford a relatively compact assembly.

5. An electric motor of the class described comprising a core assembly providing poles, windings for opposite poles of the assembly, a casing including a member providing a wall extending about the assembly, an end plate having a peripheral flange with an edge surface juxtaposed to the inner surface of said wall and with a face engaging the core assembly at the corresponding end of the motor, a rotor including a shaft extending through said plate, and a bearing for said shaft supported by the mid-portion of said end plate.

6. An electric motor of the class described comprising a core assembly providing poles, windings for opposite poles of the assembly, a casing including a member providing a wall extending about the assembly, an end plate having a peripheral flange with an edge surface juxtaposed to the inner surface of said wall and with a face engaging the core assembly at the corresponding end of the motor, said end plate providing arcuate slots into which portions of the windings may project, the plate having integral lips extending along the inner portions of said slots to provide reinforcements for the same, and a bearing supported on the mid-portion of said plate.

7. An electric motor of the class described comprising a core assembly providing poles, windings for opposite poles of the assembly, a casing member providing a wall extending around said assembly, an end plate engaging an end surface of said assembly, screw-threaded fastenings for drawing said plate inwardly against said assembly, the end of the casing member providing an annular flange extending beyond said end plate.

8. An electric motor of the class described comprising a core assembly providing poles, windings for opposite poles of the assembly, a casing member for providing a wall extending around said assembly, an end plate engaging an end surface of said assembly, screw-threaded fastenings for drawing said plate inwardly against said assembly, the end of the casing member providing an annular flange extending beyond said end plate, a rotor, a nose member carried by said rotor, said nose member having a generally conoidal form, the periphery of the nose member providing a bead juxtaposed to the edge of said annular flange whereby a finished appearance may be afforded for the joint between the casing and the rotatable nose member.

9. An electric motor of the class described comprising a cup-like sheet metal casing member, a core assembly formed of a plurality of metal laminae and providing a plurality of poles, said casing member providing a circumferential wall surrounding the core assembly, and an end plate having a continuous peripheral flange with its edge juxtaposed to the inner surface of the wall of said casing member and with a face engaging the end of the core assembly, said end plate having arcuate slots therein, windings on certain of said poles with portions positioned to project slightly into said slots, and screw-threaded fastenings for positioning the face of said peripheral flange in firm engagement with the end of the core assembly.

10. A sheet metal end plate for a motor casing of the class described comprising a dish-like member having a dished intermediate portion and a continuous peripheral flange, the dished portion having arcuate slots therein with pressed out integral flanges extending along their inner edges, the central portion of the plate having an opening arranged substantially concentrically relative to said slots.

11. A sheet metal end plate for a motor casing of the class described comprising a dish-like member having a dished intermediate portion and a continuous peripheral flange, the dished portion having arcuate slots therein with pressed out integral flanges extending along their inner edges, the central portion of the plate having an opening arranged substantially concentrically relative to said slots, the central part of the plate being shaped in the region of said opening to provide a surface conforming to the surface portion of a sphere.

12. An electric motor of the class described, comprising a rotor and a stator assembly including a casing, said casing providing an annular wall and an end plate, the end plate including a marginal portion lying in a plane at right angles to the axis of the rotor and juxtaposed to the annular wall, said marginal portion being spaced inwardly from the end of the annular wall, the latter having an end portion projecting beyond said marginal portion to provide a projecting annular flange, said assembly also including screw-threaded fastenings to hold the plate against an abutment provided by part of the stator assembly.

13. An electric motor of the class described, comprising a rotor and a stator assembly including a casing, said casing providing an annular wall and an end plate, the plate including a peripheral flange lying in a plane at right angles to the axis of the rotor and having an edge portion juxtaposed to the annular wall, said plane being spaced inwardly from the end of the annular wall, said plate having a dished intermediate portion providing a bearing for one end of the rotor, said assembly also including screw-threaded fastenings to hold the plate against an abutment provided by part of the stator assembly, said screw-threaded fastenings extending through the dished portion of the plate.

14. An electric motor of the class described, comprising a rotor and a stator assembly including a casing, said casing providing an annular wall and an end plate, the plate including a peripheral flange lying in a plane at right angles to the axis of the rotor and having an edge portion juxtaposed to the annular wall, said plane being spaced inwardly from the end of the annular wall, said plate having a dished intermediate portion providing a bearing for one end of the rotor, said assembly also including screw-threaded fastenings to hold the plate against an abutment provided by part of the stator assembly, said screw-threaded fastenings extending through the dished portion of the plate, the end of the annular wall projecting beyond said plane to cooperate with the peripheral flange and the outer part of the dished portion of the plate in affording an annular groove at the end of the motor.

BROOKS STEVENS, Jr.
PHILIP J. GILINSON.